United States Patent Office

3,689,391
Patented Sept. 5, 1972

3,689,391
METHOD FOR CHEMICALLY INITIATING PHOTOCHEMICAL REACTIONS
Edwin F. Ullman, Palo Alto, Calif., assignor to Synvar Associates, Palo Alto, Calif.
No Drawing. Filed May 13, 1970, Ser. No. 37,025
Int. Cl. B01j 1/10; C07b 29/00; C07c 167/00
U.S. Cl. 204—159                                           14 Claims

ABSTRACT OF THE DISCLOSURE

The inducement of photochemical reactions in the absence of an external light source through utilization of a chemical reaction that yields at least one product which, in its electronically excited state, either produces light emission or exhibits a sufficiently long-lived excited state so as to permit direct energy transfer to a compound capable of undergoing the photochemical reaction. The amount of energy transferred must be sufficient to initiate the reaction. Both chemiluminescent reactions and electrochemiluminescent reactions can be employed to induce the photochemical reaction.

---

This invention is directed to chemical sensitization of compounds that are capable of participating in photochemical reactions. More particularly, this invention is directed to the use of chemical reactions to produce energetically excited states of molecules (donors) which initiate photochemical reactions by transfer of their energy in solution to the photochemical reactants.

Photochemical reactions are those that are conventionally brought about by the absorption of energy in the form of visible or near ultraviolet light. The absorption of a quantum of light energy by a particular molecule or ion raises it to an electronically excited state which thereupon can undergo a chemical reaction. Such photochemical reactions will generally not occur by application of other forms of energy such as thermal or electrical energy.

Conventional photochemical reactions require the use of expensive light sources, and the reactions must be conducted in transparent vessels. To improve quantum efficiency it has heretofore been necessary to use solutions that do not contain suspended material, do not form insoluble coatings on the walls of the reaction vessel and are not opaque or even translucent, as such materials tend to diffuse and otherwise interfere with transmission of light from the source.

It has now been found that various photocehmical reactions that occur in solution can be chemically sensitized, i.e., initiated, by the electronic excitation of reactant molecules by energy transfer from energy rich molecules produced in certain chemical reactions which occur without light. Those dark reactions that produce excited states capable of causing sensitization of a reactant molecule frequently are chemiluminescent reactions and may be induced either by thermal or electrochemical activation. That is, the method of this invention involves the use of either chemical or electrochemical reactions to yield molecules in their electronically excited, energy rich states. Thus, it has been found that energetically activated molecules so provided (energy donors) can transfer their energy to reactant molecules (energy acceptors) that then undergo photochemical transformation heretofore only accomplished in the presence of an external light source. The present invention permits the carrying out of photochemical reactions in solution without the need for external light, thereby eliminating the need for expensive light sources, transparent reaction vessels and the necessity of using clear reaction solutions.

In the chemical sensitization techniques of this invention, it is not essential that the molecules be capable of light emission. An excited state of a molecule can be formed to transfer its energy to the photochemical reactant, or a ground state intermediate having high chemical potential energy can be formed that decomposes in the presence of the photochemical reactant, causing electronic excitation of the reactant. For this reason, a larger range of compounds are suitable for use in the chemical sensitization technique than are useful for production of chemiluminescence. That is, reactions which fail to produce chemiluminescence for want of a suitable emitter can still be used for chemical sensitization.

For a reaction to be useful for the initiation of a photochemical type reaction, it is necessary first that the reaction produce energy rich molecules that are capable of causing the excitation of an acceptor molecule to an electronically excited state. Second, these energy rich molecules must either be capable of light emission or stay in their energy rich state sufficiently long so as to permit direct energy transfer. Among the reactions that can provide an energy rich species are chemiluminescent reactions and electrochemiluminescent reactions. Other similar known reactions are potentially chemiluminescent but fail to give light because the excited states that are formed do not emit. In the examples, the oxalates are not chemiluminescent in the absence of fluorescers, but they undergo useful reactions.

Although this invention is not intended to be limited to any specific theoretical concept, the following is intended to explain various alternatives:

(1) An energy rich state (D*) may be an electronically excited state whereupon the following processes can occur (a) 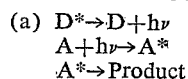

or (b) 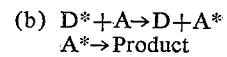

in the absence of reactant A the reaction D*→D may occur with or without light emission.

(2) An energy rich state (D*) may be an electronic ground state of a chemically energetic molecule whereupon the following processes can occur (a) D*+F→C+F*
F*→F+hν where F is a fluorescer and no reactant is present. Note that there is a chemical reaction (D*→C)

or (b) 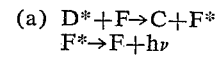

where A is the reactant.

(3) When both a fluorescer and a reactant are present the following reactions can occur.

(a) 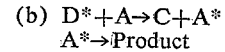

or (b) 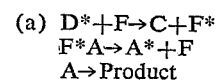

Thus, the technique of this invention involves treatment of the compound (or compounds) capable of undergoing a photochemical reaction in a solution containing molecules (energy generators) that are capable of providing an energy rich species, whether it be through the aforementioned luminescence or by direct energy transfer, or by some other mechanism.

Compounds that exhibit chemiluminescent characteristics undergo a reaction that produces a molecule in an electronically excited state. This can be accomplished by various procedures including chemical reaction, thermal decomposition, electrochemical oxidation (reduction), enzyme decomposition, and the like. Such chemical reactions frequently involve the use of oxygen or hydrogen peroxide. For example, oxalyl chloride decomposes in the presence of hydrogen peroxide and a fluorescer as shown below to yield carbon dioxide, hydrochloric acid and light of wave lengths characteristic of the fluorescence emission of the fluorescer. The following equation represents the reaction:

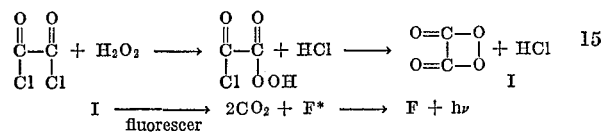

Typical of a chemiluminescence reaction that requires only heat is that which occurs when trimethyl-2-oxaoxetane is heated. It thermally decomposes to generate an electronically excited state, as illustrated by the following equation:

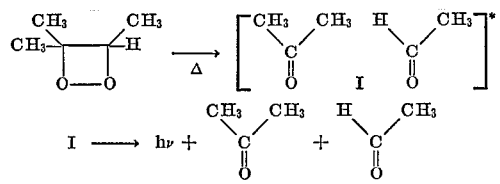

It will be appreciated by one skilled in this art that any compound capable of undergoing a photochemical reaction may be treated as disclosed herein provided that the energy required for the photochemical reaction does not exceed the electronic energy available from the chemiluminescent reaction.

The following incomplete list is intended to be representative of reactants that can provide a molecule in the necessary electronically excited energy rich state. Together with the examples of the compounds are given typical reaction conditions that will produce a molecule in an excited state from which initiation of a photochemical reaction can be accomplished.

(I) POLYCYCLIC NITROGEN CONTAINING COMPOUNDS HAVING 1–6 RINGS

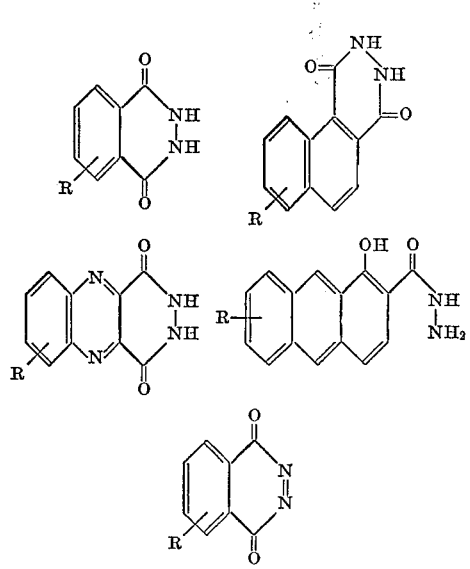

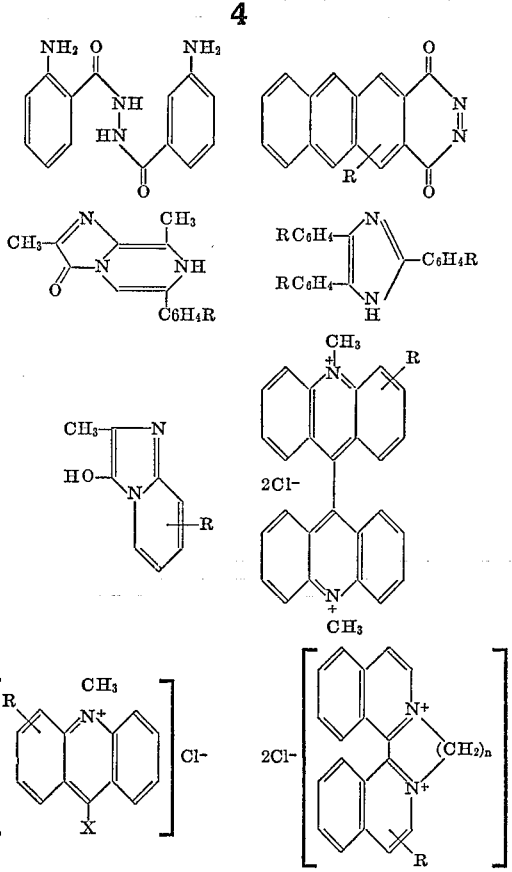

wherein $R=NH_2$, $NHCH_3$, $CH=CHC_6H_4N(CH_3)_2$, $OH$, $OCH_3$, $H$, $COCH_3$, $COC_6H_5$, aryl, alkyl, $SCH_3$, $Cl$, $Br$, $F$, $I$, $COOC_2H_5$, $CONH_2$, $N(C_6H_5)_2$, and the like, and $$X=COCl$$

$CO_2C_6H_4$, $CN$, $CO_2C_6H_4NO_2$

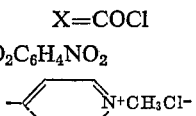

Reaction conditions require a base and $H_2O_2$ or $O_2$. Suitable solvents include $H_2O$, dimethyl sulfoxide (DMSO), N,N'-dimethylformamide (DMF), diethyl phthalate, dimethoxyethane or other polar solvents. The reaction proceeds at room temperature.

(II) POLYCYCLIC HETEROCYCLIC COMPOUNDS CONTAINING NITROGEN AND SULFUR AS HETERO ATOMS

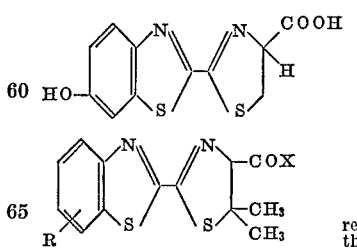

reaction conditions: luciferase, ATP and $Mg^{++}$ in water at room temperature reaction conditions: similar to those for Group I wherein $X=Cl$, $OC_6H_5$, $OC_6H_4NO_2$ and R is as defined above.

(III) PEROXIDES

Reaction conditions require base in inert solvent such as benzene, toluene, DMSO, $H_2O$, dimethoxyethane, diethyl phthalate, anisole, Decalin and the like. Reaction temperature may range from room temperature to 200° C.

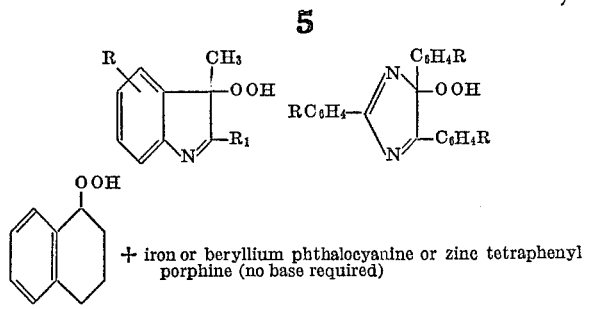

+ iron or beryllium phthalocyanine or zinc tetraphenyl porphine (no base required)

wherein $R_1=CH_3$, $C_6H_4OCH_3$ and R is as defined above.

(IV) OXALATES

Reaction conditions require $H_2O_2$, room temperature and solvents set forth in Group I. A base may be advantageous.

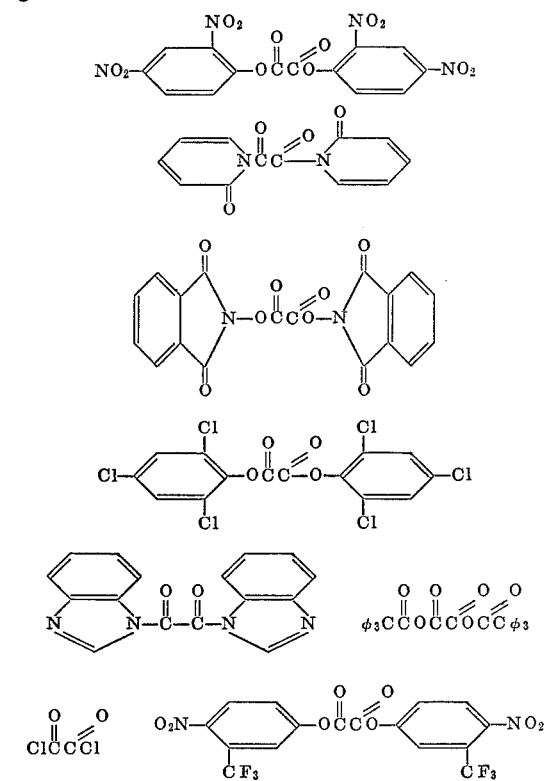

(V) IONS

Reaction conditions require strong oxidants for use with anions. These include $Cl_2$, $Br_2$,

$NO_2$, $Ce^{+4}$, $Pb(OAc)_4$, naphthoquinone, chloranil and radical cations such as Wurster's blue. Oxidation may also be achieved by electrolysis. Cations require strong reducing agents such as amines, hydroxide, N,N'-tetramethylphenylene-diamine, radical cations and hydrazine. Reduction may also be achieved by electrolysis.

Typical ions include the following:

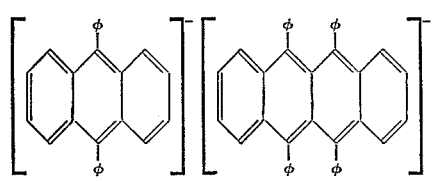

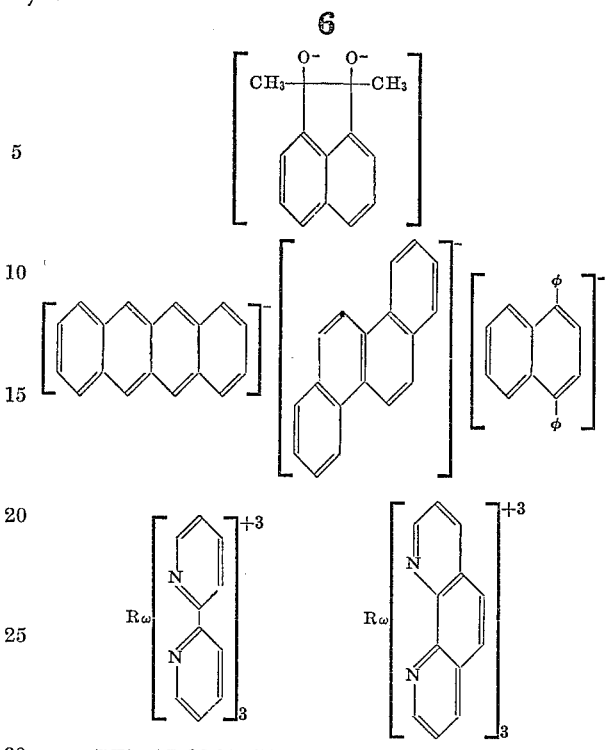

(VI) AROMATIC GRIGNARD REAGENTS

Reaction conditions require inert solvent and oxygen.

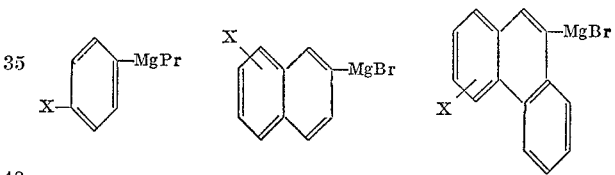

wherein X=Br, Cl, I, $OCH_3$, $N(CH_3)_2$, alkyl, aryl, $SCH_3$, and the like.

(VII) MISCELLANEOUS (A) Reactants requiring inert solvent and oxygen:

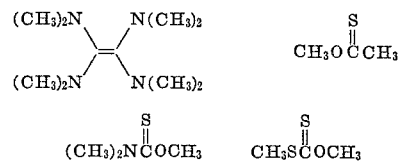

(B) Reactants similar to those for Group I:

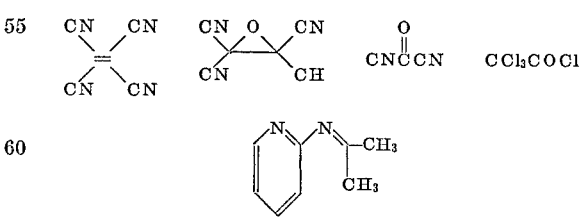

As previously noted, the excited states required for chemiluminescence may also be produced electrochemically. In this method, a compound is electrochemically oxidized (or reduced) and the resulting product is then electrochemically reduced (or oxidized) at sufficiently large voltage to regenerate the original compound in an electronically excited state. A variety of aromatic compounds are capable of producing electrochemiluminescence and include anthracene, triphenylbenzene, diphenyl naphthalene, perylene, chrysene, and the like. The excited states of these compounds can also transfer their energy to a photochemically reactive molecule.

The electrochemical procedure usually involves an alternating current so that oxidation (or reduction) products are formed at one potential and are subsequently reduced (or oxidized) at a different potential before they can diffuse away from the vicinity of the electrode. This technique is especially useful where the oxidation or reduction products are unstable. Where stable products are produced, oxidation or reduction of all of the material in the electrode compartment may be carried out with direct current and the direction of the current may then be reversed with a sufficiently high (excess) voltage so as to cause reduction (or oxidation) to the excited state of the neutral molecule.

In the electrochemical procedure, the compound to be excited is dissolved in an inert solvent containing an electrolyte such as tetrabutyl ammonium chloride in acetonitrile. The oxidation and reduction reactions primarily occur in the vicinity of the electrodes which may be in the form of grids. The electrolyte is not critical provided that it does not interact with the reactants.

In the case in which alternating current is employed a single compartment cell may be employed and the electrodes are connected to a square wave generator. Typical of the equipment suitable for generating an excited state by direct current is an H-shaped electrolytic cell consisting of two half cells connected by fritted glass disc. For a direct current system, it has been found that suitable energy transfer agents must form stable anions or cations during initial reduction or oxidation respectively. Excited states of neutral molecules must be more energetic than reactant excited states. Ions can act as quenchers which require using dilute solutions.

The following list is representative of photochemical reactions that can be initiated by chemical sensitization, the reaction in effect initiated (induced) by energy from the excited state.

I.

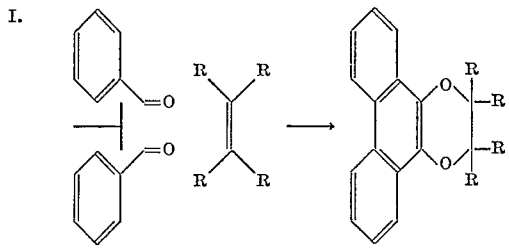

wherein R is $CH_3O$, H, $N(CH_3)_2$, halogen, aryl, alkyl, and the like.

II.

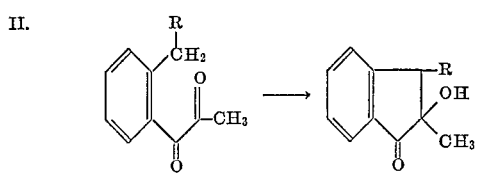

wherein R is alkyl, aryl, $OCH_3$, H, and the like.

III.

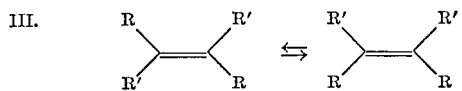

wherein R and R' are dissimilar radicals selected from alkyl, aryl, halogen, $CH_3O$, $N(CH_3)_2$, $NO_2$, $COOCH_3$, $COC_6H_5$, $COC_2H_5$, $CONH_2$, $CON(CH_3)_2$, COOH, $SCH_3$, and the like.

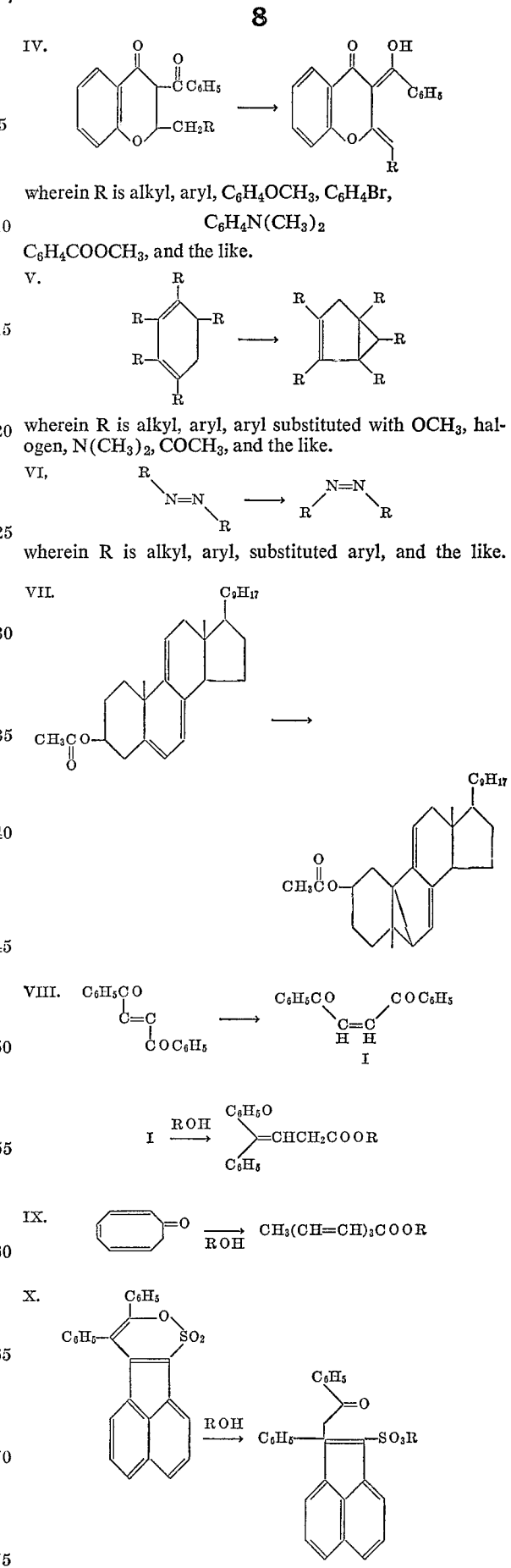

wherein R is alkyl, aryl, $C_6H_4OCH_3$, $C_6H_4Br$, $C_6H_4N(CH_3)_2$ $C_6H_4COOCH_3$, and the like.

V.

wherein R is alkyl, aryl, aryl substituted with $OCH_3$, halogen, $N(CH_3)_2$, $COCH_3$, and the like.

VI.

wherein R is alkyl, aryl, substituted aryl, and the like.

VII.

VIII.

IX.

X.

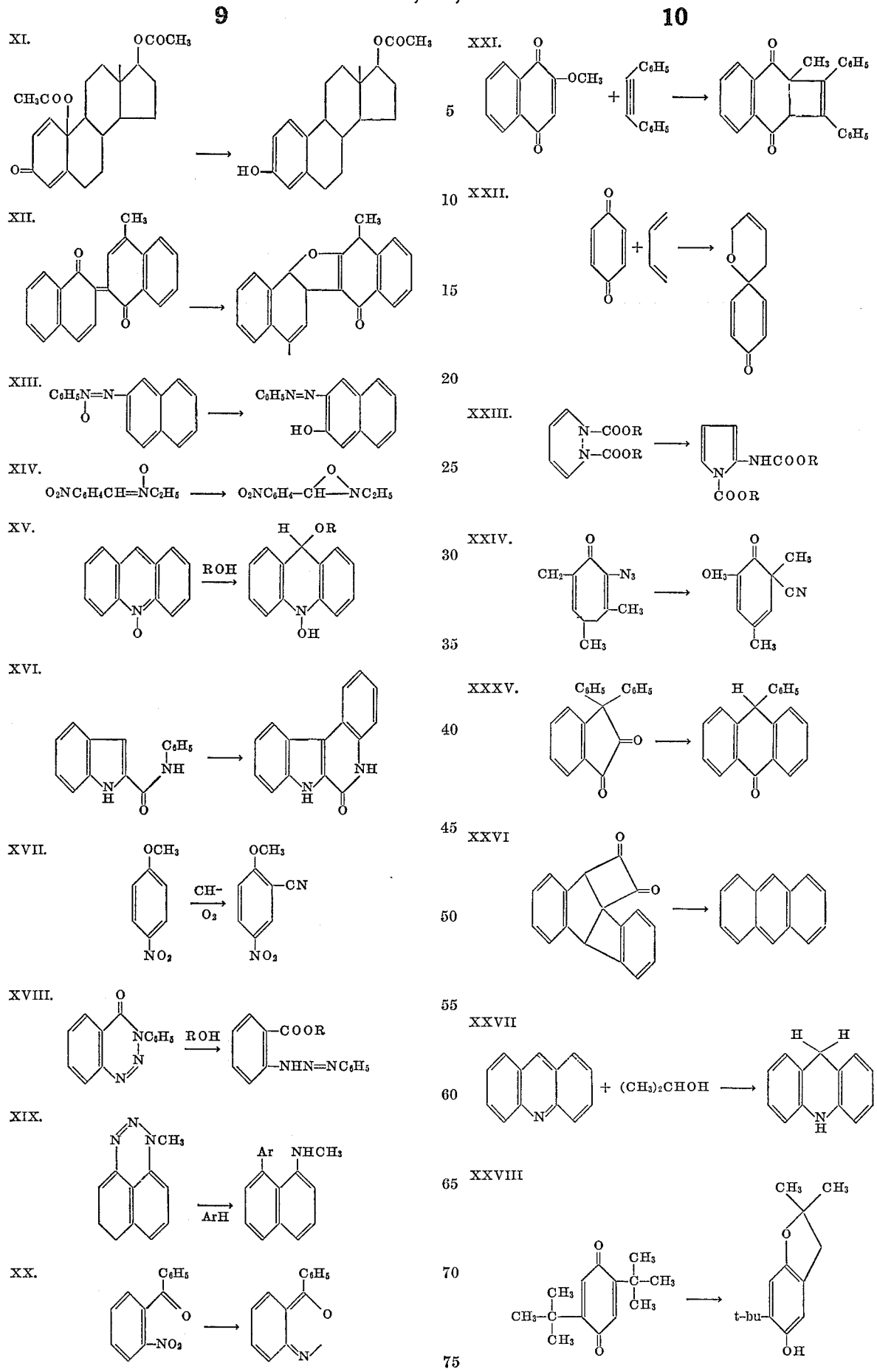

XXIX 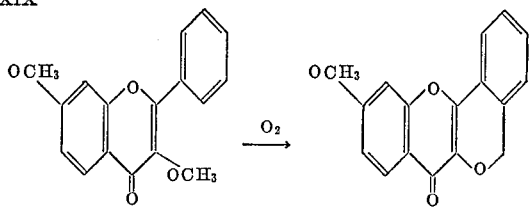

XXX 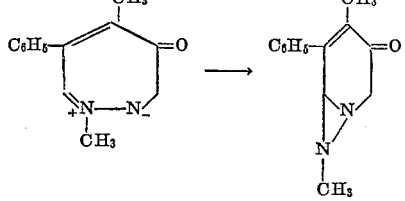

XXXI. 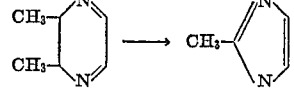

XXXII. 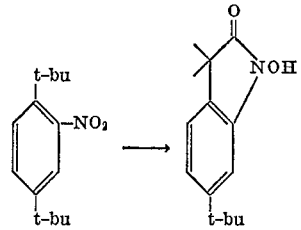

XXXIII. 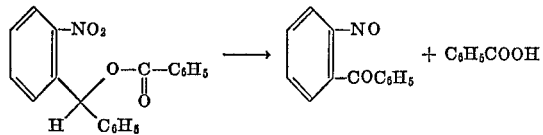

XXXIV. 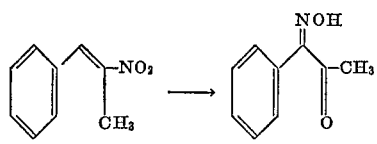

XXXV. 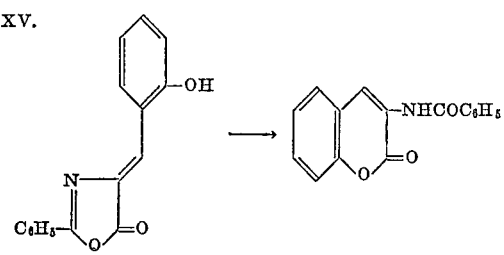

XXXVI. 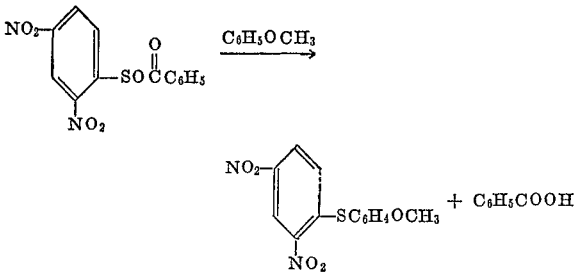

XXXVII. 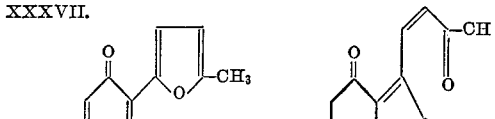

XXXVIII. 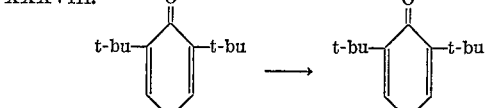

XXXIX. 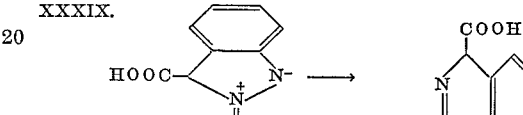

XL. 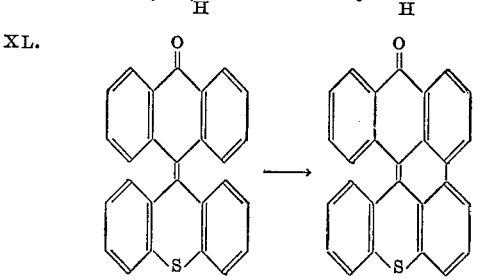

It should be appreciated that any photochemical reaction that meets the requirements set out above can be practiced by the methods of this invention. Where not stated, R in the above reactions is alkyl, aryl, substituted alkyl, substituted aryl, and he like. Although the number of carbon atoms in R is not critical, a practical limit has been found to be up to 50 carbons.

The following examples are intended to illustrate the present invention, and not as a limitation thereof.

EXAMPLE I

An electrolytic cell consisting of a single compartment and two electrodes and containing tetrabutyl ammonium chloride dissolved in acetonitrile is made $10^{-3}$ M in diphenylanthracene. Subsequently, the reactant of Equation XXXV, supra, is added, ($10^{-3}$ M), and the cell degassed by successive freezing and thawing in vacuo. A square wave alternating potential of over three volts is applied for twenty-four hours, the reaction mixture was then evaporated to dryness and chromatographed to yield α-benzamidocoumarin.

EXAMPLE II

To a benzene solution, $3 \times 10^{-3}$ M in o-tolyl-1,2-propanedione (reactant of photochemical reaction II above) containing a suspension of $1.8 \times 10^{-2}$ moles/liter of bis-(2,4-dinitrophenyl)-oxalate is added an excess of anhydrous hydrogen peroxide in glyme. About 3% of the known photoproduct, 2-methyl-2-hydroxyindanone, is obtained by evaporation of the solvent and chromatography of the residue.

EXAMPLE III

To a $5 \times 10^{-3}$ M phenanthraquinone solution in ethyl vinyl ether (reactants of photochemical reaction I above) containing a suspension of 0.02 mole/liter of bis-(2,4-dinitrophenyl)-oxalate is added an excess of hydrogen peroxide in dimethoxyethane. The reaction proceeds at room temperature. After a few hours, a 1% yield of the photo adduct

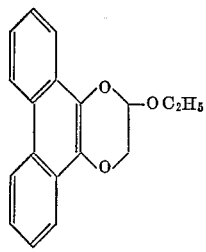

is obtained.

EXAMPLE IV

Photo reaction VII, above, is carried out using direct current electrolysis in a conventional H-shaped electrolytic cell. The cell compartments, which are separated by a fritted glass disc, are charged with tetrabutyl ammonium chloride electrolyte in dimethoxy ethane solvent and $10^{-4}$ M steroid of Equation VII, supra. The system is deoxygenated by bubbling with nitrogen. One cell compartment is made up to $10^{-3}$ M in chrysene and the other $10^{-3}$ M in chrysene radical anion tetrabutyl ammonium salt, prior to the electrochemical reaction. An EMF of at least three volts is then applied so as to discharge the resulting voltaic cell, that is, a negative potential is applied to the chrysene solution and a positive potential to the radical anion solution.

After electrolysis is complete as indicated by the disappearance of the characteristic color of the radical anion in the latter solution and by the drop in current, the potential is reversed and the process repeated. By repeating this process several times, increased yields of the photo product may be obtained. The solution is then evaporated to dryness, ether and water added, the layers separated, and the organic layer concentrated. The concentrated organic layer is then chromatographed on silica and the steroid product crystallized.

EXAMPLE V

Ten equivalents of a solution of

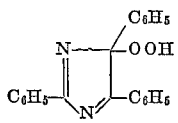

in toluene is added dropwise to a boiling toluene solution containing $1 \times 10^{-3}$ M 2,5-di-tert-butylbenzoquinone. Evaporation of the solvent and chromatography of the residue yields the photoproduct

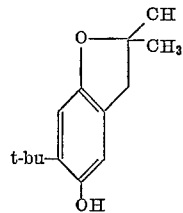

EXAMPLE VI

An electrolytic cell (similar to that employed in Example I) is charged with $10^{-3}$ M

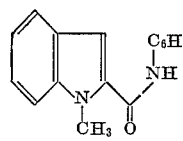

in acetonitrile saturated with tetrabutylammonium chloride containing $10^{-3}$ M 1,4-diphenylnaphthalene to make the solution $10^{-3}$ M in said agent. The solution is degassed and a square wave alternating potential of over 3 volts is applied for twenty-four hours, the solution evaporated to dryness and then chromatographed to obtain

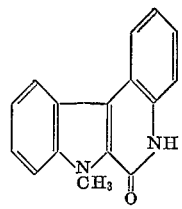

EXAMPLE VII

The procedure of Example VI is repeated using 1,8-diacetyl naphthalene as the energy transfer agent in photo reaction V, above, where R is phenyl. The solution is evaporated to dryness and then chromatographed to yield

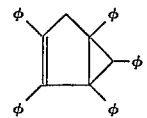

EXAMPLE VIII

Following the procedure of Example II, a 0.004 M benzene solution of trans-4-nitro-4'-methoxystilbene containing 0.02 mole/liter suspended bis-(2,4-dinitrophenyl) oxalate was treated with excess 0.1 N hydrogen peroxide in anhydrous dimethoxyethane. Evaporation of the solvent and chromatography of the residue yielded 9% of the cis-4-nitro-4'-methoxystilbene.

EXAMPLE IX

To a solution of 0.1 M hydrogen peroxide, 0.1 M sodium hydroxide, and $1 \times 10^{-3}$ M acridine in isopropyl alcohol is added dropwise a solution of

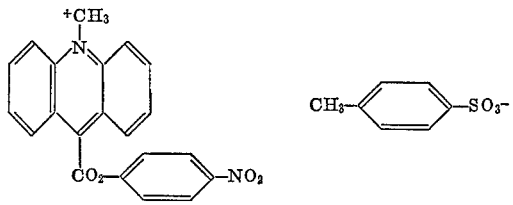

in the same solvent. After the addition of 10 equiv. of the acridinium salt the solution is evaporated nearly to dryness and the concentrated solution distributed between chloroform and water. Evaporation of the chloroform and chromatography of the residue yields 9,10-dihydroacridine.

EXAMPLE X

A solution of 0.1 M

and $1 \times 10^{-2}$ M ergosterol in benzene is refluxed for 20 minutes. The solvent is evaporated and vitamin $D_2$ isolated by column chromatography.

The foregoing invention has been described in some detail by way of illustration for purposes of clarity and understanding. It will be apparent to one skilled in this art that certain changes and modifications may be practiced within the spirit of this invention as limited only by the scope of the appended claims.

What is claimed is:

1. A process for carrying out a photochemical reaction comprising: forming a solution having a first and second component, said first component being a thermally, chemically, or electrolytically active compound, which upon activation yields at least one product, which exhibits a sufficiently long-lived excited state, so as to permit direct energy transfer, said second component being a photochemically reactive compound; causing said first component by thermal, chemical or electrolytic means, respectively, to produce an electronically excited molecule which transfers energy to said second component, thereby inducing photochemical reaction of said second component.

2. The process of claim 1 wherein said first component fluoresces at a temperature of about 0 to 150° C., thereby inducing said photochemical reaction.

3. A process in accordance with claim 1 wherein the electronically excited molecule produced from said first component is created by application of a direct current to said solution.

4. A process in accordance with claim 1 wherein the electronically excited molecule produced from said first component is created by application of an alternating current to said solution.

5. The process of claim 1 wherein said first component is selected from luminol, lophine, lucigenin and luciferin.

6. The process of claim 5 wherein said first component is luminol.

7. A process in accordance with claim 4 wherein said alternating current is a square wave alternating current.

8. A process in accordance with claim 1 wherein said second component is ergosterol.

9. A process in accordance with claim 1 wherein said first component is bis-2,4-dinitrophenyl oxalate.

10. A process in accordance with claim 1 wherein said first component is trimethyl-1,2-dioxetane.

11. A process for carrying out the photochemical reaction of converting ergosterol to vitamin $D_2$ comprising: forming a solution having a thermally active compound and ergosterol, causing said thermally active compound to produce an electronically excited molecule whereby energy is transferred to said ergosterol, inducing the reaction thereof to vitamin $D_2$.

12. A process in accordance with claim 11 wherein said thermally active compound is a peroxide.

13. A process in accordance with claim 12 wherein said peroxide is trimethyl-1-oxaoxetane.

14. A process for carrying out a photochemical reaction by transfer of energy from one molecule to a second molecule capable of undergoing a photoinitiated reaction which comprises:

reacting an oxalate with hydrogen peroxide at ambient temperatures in a solution containing a second compound capable of undergoing photo-initiated reaction; and isolating the resulting photoproducts of the second compound.

References Cited

UNITED STATES PATENTS 2,615,904   10/1952   Buck et al. _____ 260—397.2

FREDERICK C. EDMUNDSON, Primary Examiner

U.S. Cl. X.R.

204—158 R; 252—188.3, 301.2